(12) United States Patent
Ichimura

(10) Patent No.: US 7,647,855 B2
(45) Date of Patent: Jan. 19, 2010

(54) ELECTRICALLY-OPERATED CHUCK OPENING-CLOSING DEVICE

(75) Inventor: Kazuo Ichimura, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 309 days.

(21) Appl. No.: 11/850,729

(22) Filed: Sep. 6, 2007

(65) Prior Publication Data

US 2008/0073862 A1 Mar. 27, 2008

(30) Foreign Application Priority Data

Sep. 27, 2006 (JP) .............................. 2006-263324

(51) Int. Cl.
*B23B 31/02* (2006.01)
(52) U.S. Cl. ................ 82/48; 82/145; 82/164; 279/134; 279/126
(58) Field of Classification Search ............ 82/48, 82/145, 142, 165; 279/134, 126
See application file for complete search history.

(56) References Cited

U.S. PATENT DOCUMENTS

| | | | | |
|---|---|---|---|---|
| 2,180,488 A | * | 11/1939 | Hamersveld | ............. 279/134 |
| 2,619,854 A | * | 12/1952 | Schurr | ................... 82/48 |
| 2,883,889 A | * | 4/1959 | Diener | ................... 173/146 |
| 4,493,041 A | * | 1/1985 | Antoni | ................... 700/174 |
| 4,573,379 A | * | 3/1986 | Bald | ...................... 82/145 |
| 2008/0073862 A1 | * | 3/2008 | Ichimura | ............. 279/134 |

FOREIGN PATENT DOCUMENTS

JP 58-217204 A1 12/1983
JP 2001-246510 A1 9/2001

* cited by examiner

*Primary Examiner*—Willmon Fridie
(74) *Attorney, Agent, or Firm*—Burr & Brown

(57) ABSTRACT

An electrically-operated chuck opening-closing device includes a chuck that grasps workpiece, a conversion device with a control gear provided to the outer circumference, a drawbar that couples the conversion device and the chuck, a transmission gear provided to a main spindle, a second rotary shaft rotatably pivoted to be parallel to the main spindle, a first gear and a second gear rotatably provided on the second rotary shaft, an auxiliary motor that drives the first gear, a first clutch that can couple and decouple the auxiliary motor and the second rotary shaft, and a second clutch that can couple and decouple the second rotary shaft and the second gear.

7 Claims, 2 Drawing Sheets

ELECTRICALLY-OPERATED CHUCK OPENING-CLOSING DEVICE

BACKGROUND OF THE INVENTION

This application claims the benefit of Japanese Patent Application No. 2006-263324 filed on Sep. 27, 2006, the entirety of which is incorporated by reference.

1. Field of the Invention

The present invention relates to an electrically-operated chuck opening-closing device that opens and closes a chuck provided to a main spindle of a machine tool by an electrically-operated drive device.

2. Background Art

As machine tools such as lathes and the like, chuck opening-closing type machine tools with a chuck for gripping a workpiece (work) provided to the tip of the main spindle is known. Since a conventional chuck opening-closing type machine tool opens and closes the chuck by a hydraulic cylinder, there has been a problem in that not only a hydraulic cylinder is required but also hydraulic oil must be periodically changed. In addition, since the pump must be constantly operated to maintain oil pressure during processing, there is a problem of large energy consumption. In addition, there has been a problem in that the temperature rises due to heat generated by the hydraulic cylinder and degrades the processing accuracy of the workpiece. Furthermore, in the case of processing where the chuck gripping force must be changed during rotation of the main spindle as is the case with thin-walled workpiece, the rotation of the main spindle must be temporarily stopped and the chuck gripping force must be changed; this causes the operation to be troublesome and requires long time for processing.

Consequently, as disclosed in patent document 1, an electrically-operated chuck opening-closing mechanism is devised in which an auxiliary motor is provided for opening and closing the chuck independently of the motor for rotating and driving the main spindle, and the chuck gripping force can be controlled during rotation of the main spindle by the auxiliary motor. In addition, as disclosed in patent document 2, an electrically-operated chuck opening-closing mechanism is devised, which includes a gear mechanism to open and close the chuck via a draw-tube through which the inside of the main spindle is inserted and a clutch that can couple and decouple the gear mechanism to and from an auxiliary motor.

[Patent document 1]

Japanese Patent Application Laid-Open Publication No. 58-217204

[Patent document 2]

Japanese Patent Application Laid-Open Publication No. 2001-246510

DISCLOSURE OF THE INVENTION

Problem to be Solved by the Invention

However, since the electrically-operated chuck opening-closing mechanism disclosed in the above-mentioned patent document 1 must synchronously rotate the chuck opening-closing auxiliary motor constantly while the main spindle being rotated, there is a problem of extremely large energy consumption. On the other hand, since in the electrically-operated chuck opening-closing mechanism disclosed in the patent document 2, the auxiliary motor rotates synchronously only when the chuck gripping force is to be changed, energy consumption is small. However, since a clutch mechanism must be provided on the axis line of the main spindle, the main spindle must be designed to be long and at the same time, the main spindle diameter must be increased from the viewpoint of reducing deflection of the main spindle, presenting a problem in that the machine tool is unable to be designed to achieve compact size. In addition, by the weight of the main spindle and the like, inertia is increase, which is still another problem.

In addition, the electrically-operated chuck opening-closing mechanisms of patent documents 1 and 2 have a problem of degraded processing accuracy of the workpiece end face since the centrifugal force of claws of the chuck is changed due to fluctuation of main spindle rotating speed when the workpiece is machined with the main spindle rim speed kept constant (so-called constant rim speed control).

SUMMARY OF THE INVENTION

An object of the present invention is to provide an electrically-operated chuck opening-closing device that can solve the problems of conventional chuck opening-closing device, is able to easily adjust the chuck gripping force even during main spindle rotation, can process workpiece efficiently at high processing accuracy, even achieves small energy consumption and furthermore, enables a machine tool to be designed compactly.

In the present invention, the invention according to a first aspect includes a chuck provided at a tip of a main spindle of a machine tool to grasp a workpiece by a gripper, a conversion device having on an outer circumference thereof a control gear, being provided on the axis of the main spindle to convert rotary motion into linear motion in the direction of the axis of the main spindle, a drawbar provided between the conversion device and the chuck to perform linear motion by means of the conversion device so that the gripper of the chuck is operated to hold and release the workpiece, a transmission gear provided on an outer circumference of the main spindle, a first gear rotatably provided on a second rotary shaft parallel to the main spindle and meshes with the control gear, a second gear rotatably provided on the second rotary shaft and meshes with the transmission gear, an auxiliary motor that rotates the first gear, a first clutch that couples and decouples the auxiliary motor and the first gear, and a second clutch that couples and decouples the first gear and the second gear.

The invention according to a second aspect is characterized in that, during rotation of the main spindle, the auxiliary motor is rotated synchronously with the second rotary shaft to couple the first clutch and to decouple the second clutch, so that a rotation difference in rotary motion is generated between the main spindle and the conversion device, which changes a gripping force of the chuck, and that, after the chuck obtains a predetermined gripping force, the second clutch is coupled and the first clutch is decoupled so that the gripping force of the chuck is changed during rotation of the main spindle in the invention stipulated in the first aspect.

The invention according to a third aspect is characterized in that a detector is provided to detect a rotating speed difference between the control gear of the conversion device and the transmission gear of the main spindle in the invention stipulated in the first or second aspect.

The invention according to a fourth aspect further includes an arithmetic means for computing variation of centrifugal force of claws of the chuck by changes of rotating speed of the main spindle, wherein, when the main spindle is controlled to a constant rim speed, the electrically-operated chuck opening-closing device synchronizes with fluctuation of the rotating speed of the main spindle, computes a variation of the centrifugal force of claws of the chuck by the arithmetic means, uses the variation to correct a gripping force of the chuck, and thereby controls the gripping force of the chuck to be constant in the invention stipulated in any one of the first to third aspects.

The electrically-operated chuck opening-closing device according to the first and second aspects can change the chuck gripping force during main spindle rotation by converting rotary motion of the auxiliary motor provided independently from the main spindle driving motor to linear motion by a conversion device and transmitting the linear motion to the chuck via a drawbar. Consequently, by the electrically-operated chuck opening-closing device according to the first and second aspects, workpiece can be processed at high accuracy without using expensive chucks.

In addition, since the electrically-operated chuck opening-closing device according to the first and second aspects requires no hydraulic cylinder, does not need to constantly operate the pump, has a clutch mechanism (first clutch) that couples and decouples the auxiliary motor and a first gear (gear meshed with a control gear of the conversion device), does not need to constantly synchronously rotate the chuck opening-closing auxiliary motor, and is only required to supply electric power to the auxiliary motor only when the chuck gripping force is changed, the energy consumption associated with changing the chuck gripping force is small.

Furthermore, since the electrically-operated chuck opening-closing device according to the first and second aspects has a clutch mechanisms (first clutch and second clutch) on a second rotary shaft provided parallel to the main spindle, the main spindle itself can be shortened. Consequently, according to the electrically-operated chuck opening-closing device according to the first and second aspects, machine tools can be designed compactly and it is able to prevent the situation in which inertia increases as the main spindle weight increases.

Since the electrically-operated chuck opening-closing device according to the third aspect can detect the situation by a detector when any deviation is generated between the rotating speed of the control gear of the conversion device and the rotating speed of the transmission gear, it is possible to prevent the situation in which the chuck is slackened by the conversion device which inadvertently makes relative rotation with respect to the main spindle at an unintended timing.

The electrically-operated chuck opening-closing device according to the fourth aspect can effectively prevent the situation in which workpiece is disengaged or the workpiece processing accuracy is degraded due to changes of chuck gripping force since the chuck holds a constant gripping force in accordance with fluctuation of the main spindle rotating speed even when the main spindle rotating speed is inadvertently fluctuated at the time of constant peripheral speed control in which processing is carried out with the main spindle rotating speed kept constant,

DESCRIPTION OF THE PREFERRED EMBODIMENT

Figure 1:
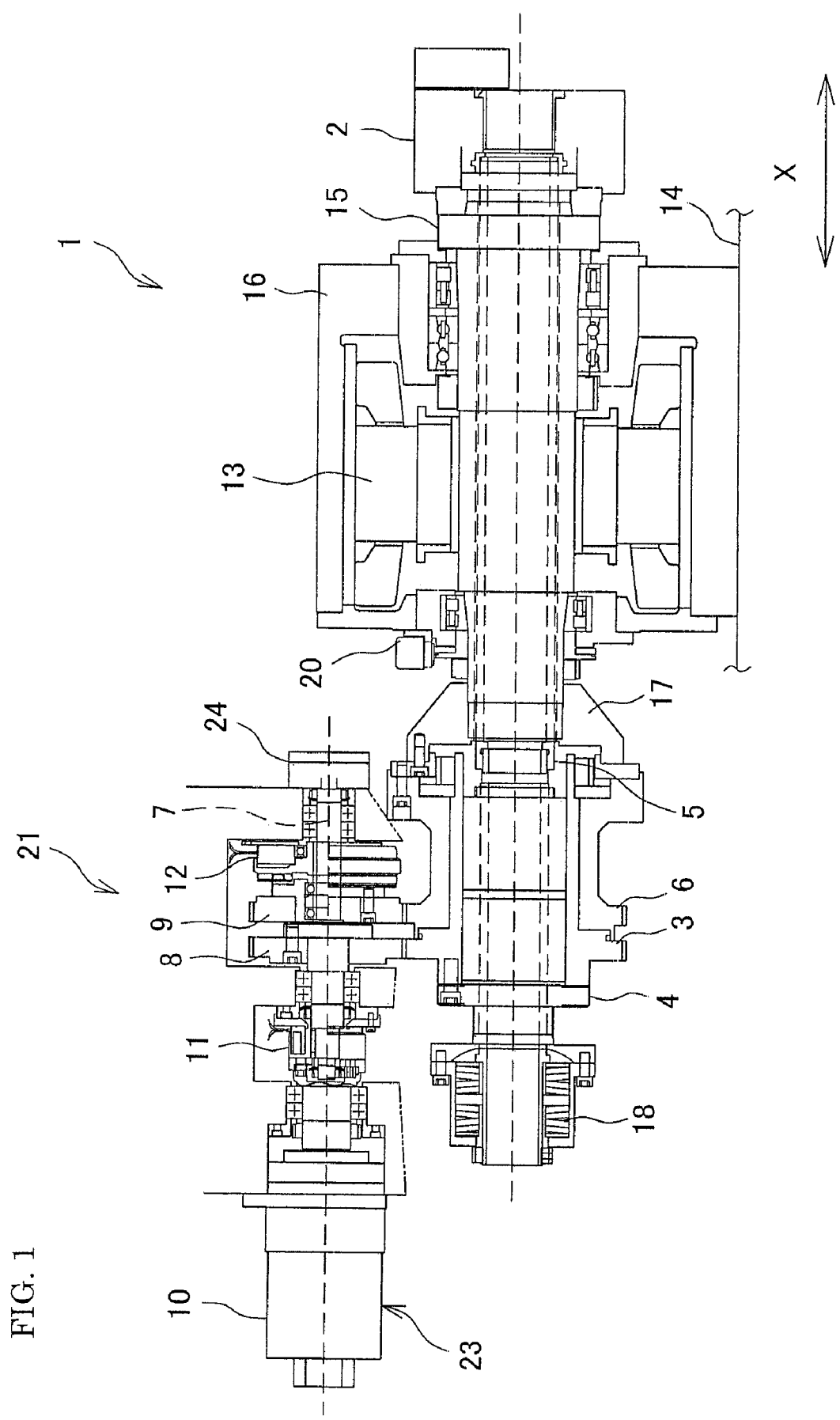
FIG. 1 is a cross-sectional view of a machine tool with an electrically-operated chuck opening-closing device is provided.
Figure 2:
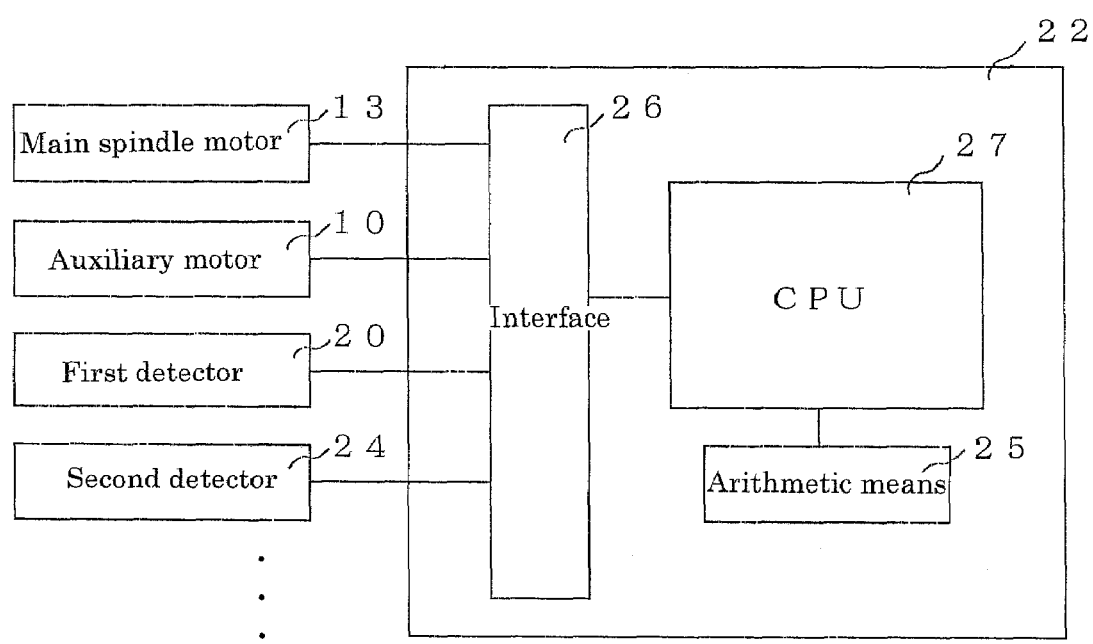
FIG. 2 is a block diagram that shows a control mechanism of the machine tool.

One embodiment of the electrically-operated chuck opening-closing device according to the present invention will be described in detail as follows with reference to the drawings. FIG. 1 is a cross-sectional view of a machine tool with an electrically-operated chuck opening-closing device and FIG. 2 is a block diagram that shows a control mechanism of the machine tool. In a machine tool 1, an electrically-operated chuck opening-closing device 21 is provided, which includes a chuck 2, a conversion device 4 which has a control gear 3, a drawbar 5, a transmission gear 6, a second rotary shaft 7, a first gear 8, a second gear 9, an auxiliary motor 10, a first clutch 11, and a second clutch 12.

The machine tool 1 is of a so-called built-in motor type, and a main-spindle motor 13 that rotates and drives a main spindle 15 rotatably supported to a headstock 14 is placed inside a housing 16. In the rear of a main-spindle motor 13, a first detector 20 that detects the rotating speed of the main spindle 15 is provided, and the first detector 20 is connected to a controller 22 which is provided independently from a body of the machine tool 1. In addition, the main-spindle motor 13 is connected to the controller 22 (connected to CPU27 of the controller via an interface 26). In addition, at the tip of the main spindle 15, the chuck 2 is provided to grasp workpiece.

On the other hand, in the rear side of the main spindle 15, an external cylinder member 17 is firmly fixed so that the external cylinder member rotates integrally with the main spindle 15. Then, on the outer circumference of the tip of the external cylinder member 17, the transmission gear 6 is provided. In addition, in the rear of the external cylinder member 17, the conversion device 4 (ball screw) that converts rotary motion to linear motion is rotatably provided, and on the outer circumference of the rear end of the conversion device 4, the control gear 3 with the number of teeth same as that of the transmission gear 6 of the external cylinder member 17 is provided.

In addition, inside the main spindle 15, an elongate drawbar 5 penetrates through, and the proximal end portion of the drawbar 5 is extending to the rear of the conversion device 4. On the outer circumference on the proximal end side of the drawbar 5, a threaded groove (not illustrated) is threaded, and is meshed with a threaded groove (not illustrated) threaded on the inner surface of the conversion device 4. The conversion device 4 is able to convert rotary motion of the control gear 3 to linear motion of the drawbar 5 (linear motion in the X direction in FIG. 1).

In addition, the tip of the drawbar 5 is engaged with the chuck 2. The chuck 2 is able to convert linear motion along the X direction of the drawbar 5 to gripping and releasing motion for workpiece (gripping and releasing motion for workpiece by not illustrated claws). Please note that, for such chuck mechanism, a publicly known mechanism is able to be suitably adopted. On the other hand, to the proximal end of the drawbar 5 which extends to the rear of the conversion device 4, a disc spring 18 that biases the drawbar 5 in the direction in which the chuck holds workpiece is coupled.

On the other hand, on the side of the main-spindle main part described above, an auxiliary drive device 23 for driving the conversion device 4 during rotation of the main spindle 15 is provided. On the front side of the auxiliary drive device 23, the second rotary shaft 7 is rotatably provided with a rotary shaft arranged parallel to the main spindle 15 set at the center.

Around the second rotary shaft 7, the second clutch 12, the second gear 9, and the first gear 8 are provided, and the second gear 9 and first gear 8 are meshed with the transmission gear 6 of the external cylinder member 17 and the control gear 3 of the conversion device 4, respectively. The first gear 8 and the second gear 9 are gears of the same speed reduction ratio (gears with the same number of teeth). In addition, on the proximal end side of the second rotary shaft 7, the auxiliary motor 10 is coupled via the first clutch 11.

The first gear 8 is firmly fixed to the second rotary shaft 7 and constantly rotates together with the second rotary shaft 7. In addition, by the first clutch 11, the auxiliary motor 10 and the second rotary shaft 7 (second gear 9) can be coupled and decoupled, and by the second clutch 12, the second gear 9 and the second rotary shaft 7 can be coupled and decoupled. Furthermore, at the tip of the second rotary shaft 7, a second detector 24 that detects the rotating speed of the second rotary shaft 7 is provided, and the second detector 24 is connected to the controller 22 as shown in FIG. 2. In addition, the auxiliary motor 10 is also connected to the controller 22.

The machine tool 1 configured as described above is brought to the state that enables rotary drive of the first gear 8 by the auxiliary motor 10 by connecting the first clutch 11 on the case that the chuck 2 is opened to grasp workpiece when rotation of the main spindle 15 is stopped. Furthermore, by releasing coupling of the second clutch 12, the control gear 3 of the conversion device 4 is allowed to rotate independently from the main spindle 15. Under this condition, the auxiliary motor 10 is rotated in a predetermined direction (hereinafter called the first direction) and the first gear 8 is rotated. Then, the control gear 3 meshed with the first gear 8 is rotated and the drawbar 5 coupled with the conversion device by the thread mechanism is moved to the tip side along the X-axis direction. Then, the claws (not illustrated) of the chuck 2 are released, thereby bringing the chuck to a state that enables gripping workpiece. Please note that, when the auxiliary motor 10 is rotated and driven, the main-spindle motor 13 is locked to prevent it from rotating so that the main spindle 15 is not rotated by the reactive force of the auxiliary motor 10. In addition, as a method for opening the claws of chuck 2 to the predetermined position, for example, it is possible to adopt a method that computes the rotation rate of the auxiliary motor 10 necessary to open the claws of chuck 2 to the predetermined position by a program and controls the rotation of the auxiliary motor 10 on the basis of the calculated value.

After the claws of the chuck 2 are opened to the predetermined position, the workpiece is inserted between claws of the chuck, the auxiliary motor 10 is rotated in the second direction opposite to the first direction and the first gear 8 is rotated to rotate the control gear 3; the drawbar 5 is moved to the proximal end side along the X-axis direction to tighten the chuck (with the claws of the chuck 2 closed), and workpiece is grasped with a predetermined force. It should be noted that, as a method for grasping workpiece by the claws of the chuck 2 with a predetermined force, for example, it is possible to adopt a method that investigates the relationship between the gripping force of workpiece and the torque applied to the auxiliary motor 10 in advance, rotates the auxiliary motor 10 by a program until a predetermined torque is applied, and thereby grasps workpiece with a predetermined force.

As described above, after workpiece is grasped with a predetermined gripping force, the second clutch 12 is coupled and at the same time, the first clutch 11 is decoupled, Thereafter, by rotating the main-spindle motor 15, the main spindle 15 is rotated and workpiece is processed. It should be noted that, the machine tool 1 can detect deviation between the first gear 8 and the second gear 9 by the first detector 20 provided to the main spindle 15 and the second detector 24 provided to the second rotary shaft 7, as well as the deviation between the control gear 3 and the transmission gear 6. And when any deviation is generated in each set of gears, the situation in which the chuck 2 is slackened due to inadvertent relative rotation of the conversion device 4 with respect to the main spindle 15 is prevented by automatically stopping the main spindle.

In addition, when the gripping force of the chuck 2 is changed during rotation of the main spindle 15, the auxiliary motor 10 is synchronously rotated with the second rotary shaft 7 which rotates associated with rotation of the main spindle 15 and under such condition, the first clutch 11 is allowed to be coupled; the rotary drive of the first gear 8 by the auxiliary motor 10 is thereby enabled. By synchronously rotating the auxiliary motor 10 and the second rotary shaft 7 in such a manner, mechanical impact when the first clutch 11 is coupled can be reduced. Thereafter, by decoupling the second clutch 12, the control gear 3 is allowed to rotate separately from the main spindle 15. And decelerating or accelerating the auxiliary motor 10 under such condition allows the control gear 3 meshed with the first gear 88 to make relative rotation with respect to the main spindle 15. Moving the drawbar 5 to the tip side along the X-axis direction or to the proximal end side by such relative rotation of the control gear 3 controls the gripping force of workpiece by the chuck 2.

After the chuck 2 is controlled to a predetermined gripping force, the second clutch 12 is coupled, the conversion device 4 is prevented from making relative rotation with respect to the main spindle 15, and at the same time, the first clutch 11 is decoupled. Thereafter, the auxiliary motor 10 is stopped. By such series of operations, even during rotation of the main spindle 15, the gripping force of workpiece by the chuck 2 can be controlled.

Inside the controller 22, an arithmetic means 25 is provided that calculates the variation of the centrifugal force of the claws of the chuck 2 caused by changes of rotating speed of the main spindle 15 (connected to CPU27 of the controller 22). Then, in the constant rim speed control which controls the rim speed of the main spindle 15 to be constant, when the rotating speed of the main spindle 15 is fluctuated, the variation of the centrifugal force associated with the fluctuation of the rotating speed of the main spindle 15 is computed by the arithmetic means 25, is synchronized with the fluctuation of the rotating speed of the main spindle 15, the thrust of the drawbar 5 (thrust along the X-axis direction) is increased and decreased in accordance with the variation of the calculated centrifugal force, and the gripping force of the chuck 2 is thereby controlled to be constant.

The electrically-operated chuck opening-closing device 21 includes the chuck 2 that grasps workpiece, the conversion device 4 with the control gear 3 provided on the outer circumference, the drawbar 5 that couples the conversion device 4 to the chuck 2, the transmission gear 6 provided to the main spindle 15, the second rotary shaft 7 rotatably pivoted to be parallel to the main spindle 15, the first gear 8 rotatably provided on the second rotary shaft 7, the second gear 9 rotatably provided on the second rotary shaft 7, an auxiliary motor 10 that drives the first gear 8, the first clutch 11 that can couple and decouple the auxiliary motor 10 and the second rotary shaft 7, and the second clutch 12 that can couple and decouple the second rotary shaft 7 and the second gear 9. Then, while the main shaft 15 is being rotated, the auxiliary motor 10 is synchronously rotated with the second rotary shaft 7 to couple the first clutch 11 and at the same time to decouple the second clutch 12, a rotation difference is generated with the main spindle 15 and the gripping force of the chuck 2 is changed, and after the chuck 2 obtains a predetermined gripping force, the second clutch 12 is coupled and at the same time, the first clutch 11 is decoupled and the auxiliary motor 10 is stopped; thereby the gripping force of the chuck 2 can be changed. Consequently, according to the electrically-operated chuck opening-closing device 21, workpiece can be processed at high accuracy without using expensive chucks.

In addition, since the electrically-operated chuck opening-closing device 21 does not need any hydraulic cylinder, there is no need to constantly operate the pump. In addition, since the electrically-operated chuck opening-closing device 21 has the clutch mechanism (first clutch 11) that couples and decouples the auxiliary motor 10 and the first gear 8 (gear that meshes with the control gear 3 of the conversion device 4), it does not need to constantly synchronously rotate the auxiliary motor 10 for opening and closing the chuck 2. The device only needs to supply electric power to the auxiliary motor 10 when the gripping force of the chuck 2 is changed. Therefore, small energy consumption associated with change of gripping force of the chuck 2 is achieved.

Furthermore, since the electrically operated chuck opening-closing device 21 has clutch mechanisms (first clutch 11 and second clutch 12) on the second rotary shaft 7 provided parallel to the main spindle 15, the main spindle 15 itself can be shortened. Consequently, according to the electrically-operated chuck opening-closing device 21, the machine tool can be designed to be compact and the situation in which the inertia increases as the weight of the main spindle 15 increases can be prevented.

In addition, since the electrically-operated chuck opening-closing device 21 is provided with the first detector 20 for detecting the rotating speed of the main spindle 15 and the second detector 24 for detecting the rotating speed of the second rotary shaft 7, when deviation is generated between the rotating speed of the control gear 3 of the conversion device 4 and the rotating speed of the transmission gear 6 of the main spindle 15, such situation can be instantaneously detected by the first detector 20 and the second detector 24. Therefore, the situation in which the chuck 2 is slackened by the conversion device 4 which inadvertently makes relative rotation with respect to the main spindle 15 at the unintended timing can be prevented.

Furthermore, the electrically-operated chuck opening-closing device 21 has an arithmetic means 25 that calculates the variation of the centrifugal force of the claws of the chuck 2 by the change of rotating speed of the main spindle 15, and when the rim speed of the main spindle 15 is controlled to be constant, in synchronism with change of the rotating speed of the main spindle 15, the electrically-operated chuck opening-closing device calculates the variation of the centrifugal force of claws of the chuck 2 by the arithmetic means 25, corrects the change of gripping force of the chuck 2 by the use of the variation, and controls the gripping force of the chuck 2 to be constant. Consequently, even when the rotating speed of the main spindle 15 is inadvertently fluctuated during the constant rim speed control, the chuck 2 holds a constant gripping force in response to fluctuation of rotating speed of the main spindle 15 and the situation in which workpiece is disengaged or the processing accuracy of workpiece is degraded due to changes of gripping force of the chuck 2 can be effectively prevented.

It should be noted that, the configuration of the electrically-operated chuck opening-closing device according to the present invention is not to be restricted by the form of the above-mentioned embodiment, and the configuration of shapes, constructions and the like of the chuck, conversion device, drawbar, control gear, transmission gear, second rotary shaft, first gear, second gear, auxiliary motor, first clutch, second clutch and the like can be suitably changed without departing from the spirit and the scope of the invention.

For example, the electrically-operated chuck opening-closing device is not to be restricted to that with the auxiliary drive device provided on the side of the main spindle body, and the auxiliary drive device may be provided above or below the main spindle body. In addition, the electrically-operated chuck opening-closing device is not to be restricted to that with the conversion device which has the gear with the number of teeth same as that of the gear of the main spindle or that with the first gear whose number of teeth is the same as that of the second gear, and as far as the rotation of the auxiliary motor is exactly synchronized with the rotation of the main spindle on the basis of the speed reduction ratio and the like, of the first gear and the second gear, the electrically-operated chuck opening-closing device may have the number of gear teeth of the conversion device which differs from the number of gear teeth of the main-spindle or the number of first gear teeth which differs from that of the number of second gear teeth.

Since the electrically-operated chuck opening-closing device achieves outstanding effects as described above, in various kinds of machine tools with a chuck provided at the tip of the main spindle, the electrically-operated opening-closing device can be extensively applied as a mechanism that changes the gripping force of the chuck while the main spindle is being rotated.

What is claimed is:

1. An electrically-operated chuck opening-closing device, comprising:
   a chuck provided at a tip of a main spindle of a machine tool to grasp a workpiece by a gripper;
   a conversion device having on an outer circumference thereof a control gear, being provided on the axis of the main spindle to convert rotary motion into linear motion in the direction of the axis of the main spindle;
   a drawbar provided between the conversion device and the chuck to perform linear motion by means of the conversion device so that the gripper of the chuck is operated to hold and release the workpiece;
   a transmission gear provided on an outer circumference of the main spindle;
   a first gear rotatably provided on a second rotary shaft parallel to the main spindle and meshes with the control gear;
   a second gear rotatably provided on the second rotary shaft and meshes with the transmission gear;
   an auxiliary motor that rotates the first gear;
   a first clutch that couples and decouples the auxiliary motor and the first gear; and
   a second clutch that couples and decouples the first gear and the second gear.

2. The electrically-operated chuck opening-closing device according to claim 1, wherein, during rotation of the main spindle, the auxiliary motor is rotated synchronously with the second rotary shaft to couple the first clutch and to decouple the second clutch, so that a rotation difference in rotary motion is generated between the main spindle and the conversion device, which changes a gripping force of the chuck, and wherein, after the chuck obtains a predetermined gripping force, the second clutch is coupled and the first clutch is decoupled so that the gripping force of the chuck is changed during rotation of the main spindle.

3. The electrically-operated chuck opening-closing device according to claim 1, wherein a detector is provided to detect a rotating speed difference between the control gear of the conversion device and the transmission gear of the main spindle.

4. The electrically-operated chuck opening-closing device according to claim 2, wherein a detector is provided to detect a rotating speed difference between the control gear of the conversion device and the transmission gear of the main spindle.

5. The electrically-operated chuck opening-closing device according to claim 1, further comprising an arithmetic means for calculating variation of centrifugal force of claws of the chuck by changes of rotating speed of the main spindle,
   wherein, when the main spindle is controlled to a constant rim speed, the electrically-operated chuck opening-closing device synchronizes with fluctuation of the rotating speed of the main spindle, calculates a variation of the centrifugal force of claws of the chuck by the arithmetic means, uses the variation to correct a gripping force of the chuck, and thereby controls the gripping force of the chuck to be constant.

6. The electrically-operated chuck opening-closing device according to claim 2, further comprising an arithmetic means for calculating variation of centrifugal force of claws of the chuck by changes of rotating speed of the main spindle,
   wherein, when the main spindle is controlled to a constant rim speed, the electrically-operated chuck opening-closing device synchronizes with fluctuation of the rotating speed of the main spindle, calculates a variation of the centrifugal force of claws of the chuck by the arithmetic means, uses the variation to correct a gripping force of the chuck, and thereby controls the gripping force of the chuck to be constant.

7. The electrically-operated chuck opening-closing device according to claim 3, further comprising an arithmetic means for calculating variation of centrifugal force of claws of the chuck by changes of rotating speed of the main spindle,
   wherein, when the main spindle is controlled to a constant rim speed, the electrically-operated chuck opening-closing device synchronizes with fluctuation of the rotating speed of the main spindle, calculates a variation of the centrifugal force of claws of the chuck by the arithmetic means, uses the variation to correct a gripping force of the chuck, and thereby controls the gripping force of the chuck to be constant.

* * * * *